United States Patent Office 3,524,128
Patented Aug. 11, 1970

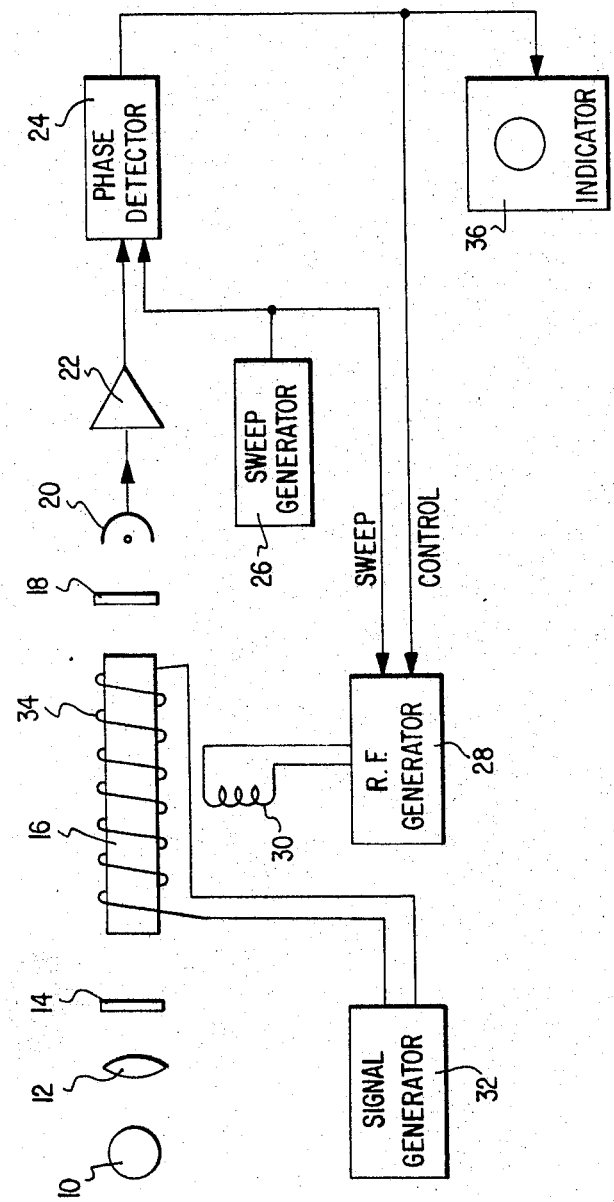

3,524,128
MAGNETOMETER OPTIMIZATION METHOD AND APPARATUS
Daniel P. Hearn, Tulsa, Okla., assignor to Sinclair Research, Inc., New York, N.Y., a corporation of Delaware
Filed Nov. 3, 1967, Ser. No. 680,426
Int. Cl. G01r 33/08
U.S. Cl. 324—.5         8 Claims

ABSTRACT OF THE DISCLOSURE

An apparatus for and a method of optimizing the operation of an optically pumped magnetometer. An optically pumped magnetometer, comprising a radiation source, a radiation absorption cell, a radiation detector, a phase detector, and a radio frequency oscillator driving a coil coupled to the radiation cell, further includes a low frequency signal generator coupled to another coil, the field of which impinges upon the absorption cell. This signal generator causes modulation of the magnetic field within the absorption cell. The modulated magnetic field has a frequency so high that the magnetometer electronic feedback control system cannot respond to it completely. As a result, an error voltage component is developed in the magnetometer output at this modulation frequency. The error signal component amplitude is proportional to the sensitivity of the magnetometer. An indicator monitors the error signal component at the phase detector output. Adjustments of the various electrical and optical components within the magnetometer system are then made to maximize the error signal component, resulting in optimum magnetometer sensitivity.

Many geophysical endeavors include mapping of the earth's magnetic field. For example, prospecting for mineral deposits beneath the earth's surface is frequently done by determining deviations in the earth's magnetic field along the surface of the earth. Magnetic field deviations are often indicative of mineral deposits of interest lying at some depth below the surface of the earth. Numerous other endeavors also include mapping of the earth's magnetic field.

Among the more recently developed devices for monitoring of magnetic fields is the optically pumped magnetometer. A typical such device includes a source of radiation, a radiation absorption cell through which the source of radiation is directed, and a radiation detector on which the radiation impinges after passing through the absorption cell. Electronics are included to cause a radio frequency magnetic field within the absorption cell. Absorption of radiation within the cell is a function of the frequency of the locally introduced radio frequency field which in turn is indicative of the ambient magnetic field in which the magnetometer is situated. The amount of absorption within the cell is determined by monitoring the output of the radiation detector. Thus the frequency of the locally induced radio frequency field is swept through a limited range, and the radiation detector output is monitored. The radio frequency at which the radiation absorption is a maximum is indicative of the intensity of the ambient magnetic field. Variations on this basic optically pumped magnetometer include utilization of lenses and filters to optimize the signal to noise ratio and include use of the radiation detector output as the source of the locally induced radio frequency field, resulting in a self-oscillating magnetometer.

Numerous adjustments must be made in the various components within an optically pumped magnetometer in order to optimize the magnetometer performance.

Among the parameters requiring adjustment are the pumping light intensity, the lenses and filters within the optical system, the depumping field intensity, the absorption cell brightness, the amplitude of the sweep frequency, the phase between the sweep signal and the reference signal, and the gain of amplifiers and other electronic circuitry utilized at various points within the system. Unfortunately, the many adjustments are interrelated, and while one adjustment might be made to optimize performance, subsequent adjustment of another parameter may result in requiring further adjustment of a previously adjusted parameter. The effect of any one change may not be evident until lengthy readings and comparisons are made. Consequently, determining the proper adjustment of all of the various parameters to achieve optimum magnetometer operation is a lengthy process.

The present invention is a system for and a method of optimizing the performance of a magnetometer by permitting immediate indication of the effect of each adjustment. The magnetic field within the magnetometer is varied slightly by superposition of a locally generated magnetic field having a frequency high enough that the magnetometer electronic feedback control system cannot respond to it completely. The resulting error voltage has a frequency component at this locally generated magnetic field frequency and an amplitude proportional to the sensitivity of the magnetometer. Monitoring of this error signal component as adjustments are made to the magnetometer system permits instantaneous determination of the effects of each adjustment. Thus the error signal component is maximized, resulting in optimum magnetometer sensitivity. Since the error signal component is monitored while the adjustments are being made, for example on a cathode ray oscilloscope, the magnetometer adjustment process can be rapidly accomplished.

These and other aspects of the present invention are apparent in the following detailed description and claims, particularly when read in conjunction with the accompanying drawing which is a block diagram of the present invention.

In the drawing, radiation from a source 10, which by way of example could be a helium lamp, passes through a lens 12, a circular polarizer 14, and into a radiation absorption cell 16. Cell 16 is filled at a reduced pressure with a gas which is excited to a metastable state, for example, by means of energizing electrodes (not shown). If radiation source 10 is a helium lamp, then by way of example, absorption cell 16 could be filled with helium gas.

Radiation emerging from absorption cell 16 passes through filter 18 to radiation detector 20. Filter 18 is a radiation filter passing a selected wave length to increase the signal to noise ratio of the apparatus. If radiation source 10 is a helium lamp, then filter 18 is selected to pass the $1.08\mu$ wave length of the helium lamp, and light detector 18 must be able to detect that $1.08\mu$ wave length radiation.

The electrical signal output of radiation detector 20 is applied as an input to amplifier 22 which has its output tied to one input of phase detector 24. Sweep generator 26 applies a signal to the second input of phase detector 24 and to the sweep input of radio frequency generator 28. The output of phase detector 24 is connected to the control input of radio frequency generator 28 which has its output applied to coil 30 to produce a radio frequency magnetic field within absorption cell 16. Sweep generator 26 might be a sawtooth wave generator, a triangular wave generator, or a sine wave generator, by way of examples.

Components 10–30 comprise an optically pumped magnetometer, as is well known in the art. The gas within absorption cell 16 is excited to its metastable state, and radiation from source 10 passes through it. The radio frequency magnetic field caused by current in coil 30 causes the gas within absorption cell 16 to return to its stable state. In returning to the stable state, the gas within cell 16 absorbs some of the radiation passing through cell 16 from radiation source 10 to radiation detector 20. The frequency of the RF magnetic field at which that absorption is a maximum is indicative of the intensity of the magnetic field in which absorption cell 16 is located. Sweep generator 26 causes the frequency of the output from RF generator 28 to slowly sweep through a limited frequency range including the frequency of maximum radiation absorption. The signal applied from radiation detector 20 through amplifier 22 to the first input of phase detector 24 includes a component at the sweep frequency. Phase detector 24 detects the sweep frequency signal and provides a control signal for RF generator 28 to control the frequency of the output of generator 28 so that it is always at the point of maximum absorption of radiation within absorption cell 16.

Components 10 through 30 thus comprise a closed loop electronic feedback control system. Obviously other configurations of equipment could be utilized, such as a self-oscillating magnetometer. The closed loop electronic feedback control system responds to changes in the magnetic field by changing the frequency of the current within coil 30. The response time of this closed loop system is limited by the components within the system. For example, the system might be capable of responding to changes up to a limit in the order of 10 hertz.

Each of the components of the magnetometer comprising components 10-30 affects the performance of the magnetometer. Variation in any of these components results in variations in the magnetometer sensitivity. Optimization of the magnetometer sensitivity requires determination of the particular combination of component adjustments best suited to system performance. To achieve this optimization expeditiousy, signal generator 32 has its output applied to coil 34 which may be wound around absorption cell 16. Signal generator 32 provides an alternating signal, for example, a signal having a frequency in the order of 60 hertz. This signal produces small periodic variations in the magnetic field within absorption cell 16. As a consequence, the output of radiation detector 20 contains a signal at this frequency which is present as an error signal in the output from phase detector 24. Since the magnetometer electronic feedback control system has a frequency response with an upper limit in the order of 10 hertz, the system is not able to respond rapidly enough to remove this 60 hertz error signal component.

The output of phase detector 24 is connected to indicator 36 which may be tuned to the frequency of the error signal component. By way of example, indicator 36 could be a cathode ray oscilloscope which displays the 60 hertz error signal component upon its screen.

The magnitude of the error signal component is indicative of the sensitivity of the magnetometer. Thus as adjustments are made to the various components in the magnetometer system to maximize the system sensitivity, corresponding changes take place in the error signal component displayed by indicator 36. Consequently, the effect of any adjustment is immediately known, and various adjustments can be made until the maximum error signal component is obtained, indicating maximum magnetometer sensitivity.

Throughout this country, 60 hertz power is generally utilized in populated areas, and indeed many of the components of the magnetometer system might obtain their initial power from a 60 hertz source. As a consequence, stray 60 hertz magnetic fields are frequently encountered. Thus preferably signal generator 32 is a 60 hertz generator phase locked to local power or derived from local power in order to eliminate beat frequencies. If, for example, signal generator 32 were a 29 hertz generator, there might exist a 2 hertz output signal resulting from the beating of the 58 hertz second harmonic with ambient 60 hertz fields.

What is claimed is:

1. In a magnetometer having source means for the emission of resonance radiation, radiation absorption cell means having radiation emitted from the source means directed therethrough to produce alignment of atoms in the cell means, means to produce an alternating magnetic field in the cell means of a frequency which diminishes the alignment of the atoms, and radiation detection means for producing an output proportional to the intensity of impinging radiation from the source means which passes through the cell means, each of the means being adjustable to permit optimization of the performance of the magnetometer, the magnetometer including an electronic feedback control system connected between said detection means and said means to produce an alternating magnetic field, said electronic feedback control system having a maximum frequency response limit, the improvement comprising generating means for producing within the absorption cell means a local alternating magnetic field of a frequency greater than said maximum frequency response limit to cause an error voltage component at the frequency of the local alternating magnetic field, in the output of said detection means, monimeans being adjustable, the magnetometer including toring means for continuously monitoring the error signal component as the adjustable means are adjusted to maximize the error signal component, thereby optimizing the magnetometer sensitivity.

2. The improvement of claim 1 in which said generating means comprises a signal generator having a frequency greater than said maximum frequency response and coupled to a wire loop magnetically coupled to said radiation cell means.

3. The improvement of claim 2 in which said monitoring means includes a cathode ray oscilloscope.

4. The improvement of claim 3 in which said signal generator has an output frequency of 60 hertz.

5. The method of optimizing the sensitivity of an optically pumped magnetometer having source means for the emission of resonance radiation, radiation absorption cell means having radiation emitted from the source means directed therethrough to produce alignment of atoms in the cell means, means to produce an alternating magnetic field in the cell means of a frequency which diminishes the alignment of the atoms, and radiation detection means for producing an output proportional to the intensity of impinging radiation from the source means which passes through the cell means, each of the means being adjustable, the magnetometer including an electronic feedback control system connected between said detection means and said means to produce an alternating magnetic field, said electronic feedback control system having a maximum frequency response limit, the method comprising:

(a) inducing within the radiation absorption cell means a local alternating magnetic field of a frequency greater than said maximum frequency response limit to cause an error signal component in the output of the detection means at the frequency of the local alternating magnetic field;

(b) monitoring the error signal component; and (c) adjusting the adjustable means to maximize the amplitude of the error signal component.

6. The method of claim 5 in which the inducing is accomplished by passing an alternating current through a coil magnetically coupled to said magnetometer.

7. The method of claim 5 in which the inducing is accomplished by passing a 60 hertz current through a coil encircling said magnetometer.

8. The method of claim 6 in which the monitoring is accomplished by displaying said error signal component on a cathode ray oscilloscope.

References Cited

UNITED STATES PATENTS

| | | | |
|---|---|---|---|
| 3,071,721 | 1/1963 | Dehmelt | 324—0.5 |
| 3,173,082 | 3/1965 | Bell | 324—0.5 |
| 3,174,099 | 3/1965 | Larson | 331—3 |
| 3,249,855 | 5/1966 | Bladen | 324—0.5 |
| 3,348,165 | 10/1967 | Inouye | 331—3 |

RUDOLPH V. ROLINEC, Primary Examiner

M. J. LYNCH, Assistant Examiner